Oct. 8, 1929.

E. B. FLANIGAN 1,730,928

VEHICLE BRAKE

Filed Jan. 23, 1926    2 Sheets-Sheet 1

Inventor
Edwin B. Flanigan,
Watson, Coit, Morse & Grindle
Attorney

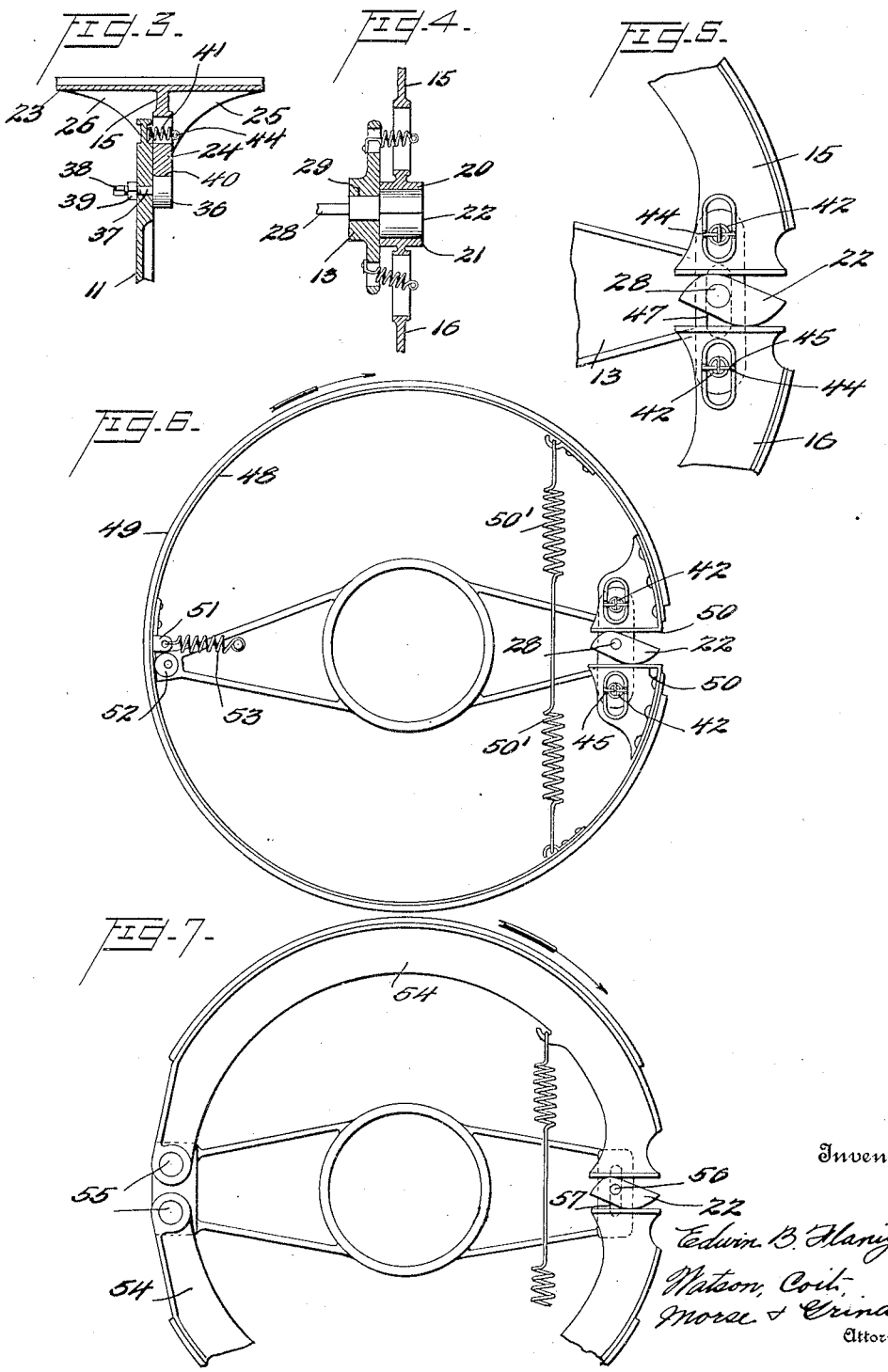

Patented Oct. 8, 1929

1,730,928

UNITED STATES PATENT OFFICE

EDWIN B. FLANIGAN, OF WILKES-BARRE, PENNSYLVANIA, ASSIGNOR TO E. B. FLANIGAN, INCORPORATED, OF WILKES-BARRE, PENNSYLVANIA, A CORPORATION OF PENNSYLVANIA

VEHICLE BRAKE

Application filed January 23, 1926. Serial No. 83,258.

This invention relates to vehicle brakes and more particularly to operating cams for such brakes.

It is a general object of the present invention to provide a novel and improved type of operating cam for vehicle brakes.

More particularly it is an object of the invention to provide a differential cam for use in operating or applying vehicle brakes.

Another object of the present invention consists in the provision of a cam, which may be mounted on a fixed or floating shaft, and which will move one shoe or one end of a brake band a greater distance than the other.

Still another object of the present invention consists in the provision of a brake actuating cam which also functions as a stop for one shoe, or one end of a brake band, in that type of brake having a self-rapping or servo action.

Various other details of brake mechanism adapted particularly for cooperation with brakes using the cam of the type described are also some important features of the invention.

In the accompanying drawings are shown several exemplary modifications of the invention with the understanding, however, that the same is not to be limited in its application to the particular construction disclosed and that the invention shall only be limited by the scope of the attached claims.

In said drawings:

Figure 3 is a partial transverse vertical section on line 3—3 of Figure 2;

Figure 4 is a view similar to Figure 3 on line 4—4 of Figure 2;

Figure 5 is a partial side view of a brake similar to that disclosed in Figure 2 but showing the cam mounted on a floating operating shaft;

Figure 6 is a side elevation of a band type of brake equipped with a differential cam; and Figure 7 is a view similar to Figure 6 of a shoe type of brake in which the shoes are hinged upon stationary pivots and are actuated by a differential cam.

Like reference characters are applied to similar parts throughout the various views.

The vehicle brakes as at present used, particularly in automotive vehicles, both for small and large pleasure vehicles and heavy, high-duty commercial vehicles, are subject to much severer usage than ever before. With the advent of the interurban bus which travels at high speeds with heavy loads it has been found that brakes relying solely on the muscular effort of the driver for their application are not adequate, under the present traffic conditions, to properly control such vehicles. In my co-pending application Serial No. 738,818, filed September 20, 1924, there is disclosed a form of internal expending brake which is self-wrapping and therefore has what may be termed a servo action making use of a considerable amount of the energy of the moving vehicle to apply the brake shoes to the brake drum, the application of such energy being controlled manually by the usual foot pedal. The present invention contemplates improvements in that brake and particularly in the cam for forcing the shoes against the brake drum.

At present there are two types of cams commonly used for applying the brake shoes. The first, and perhaps the most common, is the double lobed cam in which the operating face of each lobe is the same distance from the center of rotation of the cam as the corresponding face of the opposite one. Such a cam applies each shoe equally to the drum, assuming proper initial adjustment. Second, the single lobed cam, with a concentric heel, which acts on one shoe alone. The heel may be used as a stop to take the reaction of the opposite shoe. Both of these types of cams are shown in the above noted application.

The present invention contemplates the use of a two lobed cam which may be termed differential. One lobe has its operating face spaced a greater distance from the center of rotation than the other. This type of cam may be used to expand both shoes of the brake at the same time and to form a stop for either one of them, depending upon the direction of rotation of the brake drum at any particular time.

Figure 2:
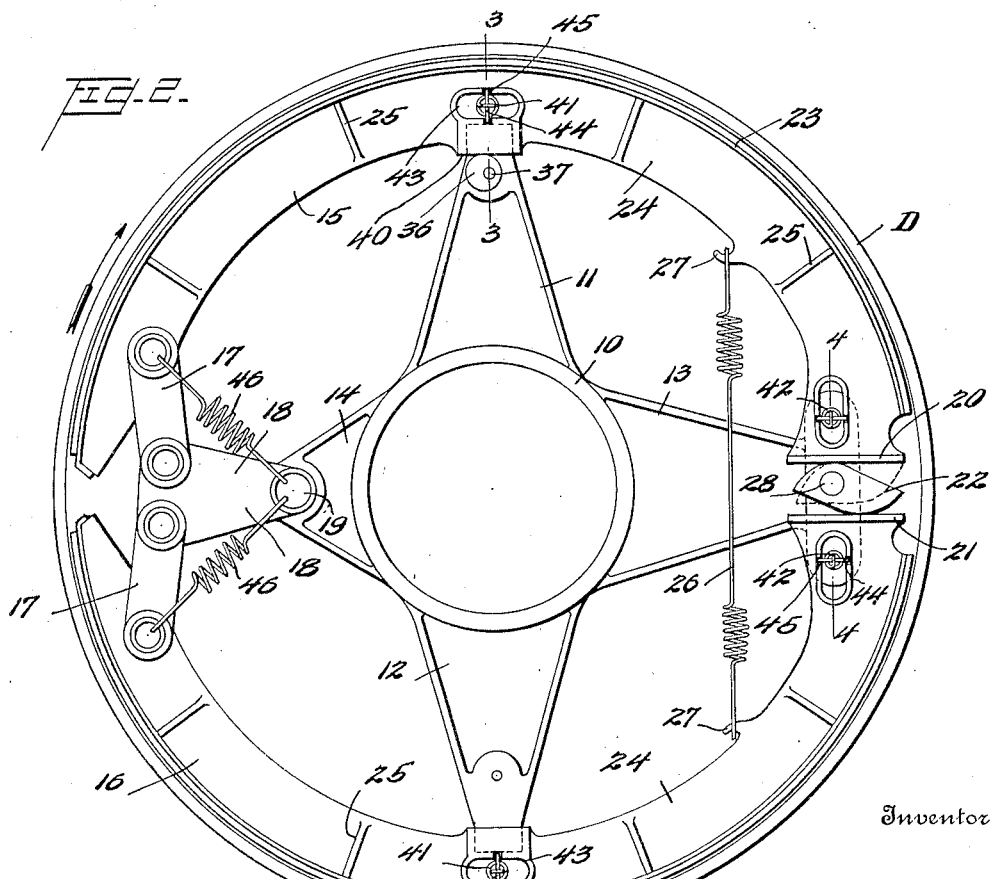
Figure 2 is an elevation of one type of vehicle brake showing the cam applied.

Referring particularly to Figure 2 there is disclosed at 10 a sleeve or ring, adapted to be rigidly secured against rotation and longitudinal movement, to the axle tube or any other stationary portion of the vehicle. Radiating therefrom are the upper and lower arms 11 and 12, the cam axis supporting arm 13 and the short anchor arm 14. These arms and the ring together may be generically termed the brake spider and may be replaced by a disk or plate adapted to perform the same functions. A pair of substantially semicircular friction elements in the form of brake shoes 15 and 16 are provided, here shown as connected together near one pair of their adjacent ends by means of pivoted links 17. The inner ends of these links are pivoted to the arm 18 which is pivoted at 19 to the anchor arm 14 of the spider. The arm 14 having a pivot point 19 for the link 18 is termed "anchor" in spite of its difference from the customary anchor where the brake shoes or band are fixed thereto. The anchor point takes a portion of the reaction of the primary brake shoe due to the angularity of the link 17 and the reaction of the secondary shoe. By changing the angles of the links 17 and 18 in respect to the shoes any desired portion of the reaction of the primary shoe can be taken by this point 19 which can therefore properly be termed an anchor. At their opposite ends the shoes are provided with the cam follower faces 20 and 21 adapted to engage the operating faces of the cam, generally indicated at 22. As shown in Figures 2 and 3 the shoes are identical and of substantially T-section, each having the outer circumferential flange 23 upon which any suitable friction lining may be secured in the usual manner. Suitable reinforcing webs or gussets 25 may be supplied to maintain the integral web 24 in its proper relation to the flange. A retractile spring 26 is connected between suitable projections 27 on the brake shoes to maintain them out of contact with the brake drum D, except when expanded by the cam.

The cam 22 is supported upon and actuated by a shaft 28 having a bearing in the arm 13 of the brake spider, as shown at 29 in Figure 4. This shaft 28 is provided with any suitable brake lever, not shown, by means of which it can be connected to the foot pedal for suitable partial rotation. As shown in Figure 2 in full lines, the cam has been partially rotated from its normal position which is shown dotted. The brake, as disclosed in Figures 2, 3 and 4, is intended to act on the drum D rotating in the direction of the arrow when the car is traveling forward. When the lower shoe is expanded by rotation of the cam, it pivots about its link 17 and is pressed into engagement with the drum and moves slightly therewith, then thru the medium of the link 17 and lever 18 this shoe 16 presses the upper shoe 15 in the direction shown by the arrow and forces it tightly into engagement with the brake drum, the upper surface of the cam forming a stop, to limit its amount of rotation under the action of the lower shoe. Such a brake partakes of the nature of a servo-mechanism, for the energy of the rotating drum applies braking effort to the upper shoe, thru the action of the lower shoe, and the linkage mechanism, which in itself prevents binding at the anchor ends of the shoes.

Figure 1:
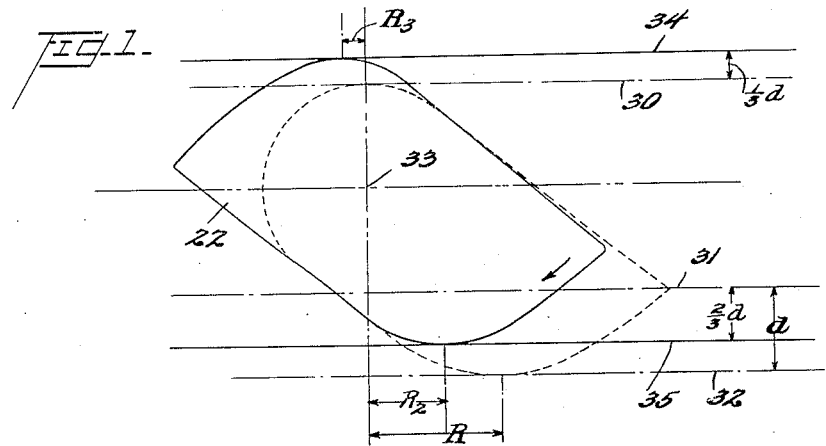
Figure 1 is a more or less diagrammatic view of a differential cam showing its method of operation.

Referring now to Figure 1 there is shown in full lines a cam such as shown at 22 in Figure 2 and in dotted lines a single lobed cam. The dash lines 30 and 31 indicate the distance between the upper and lower surfaces of the cam when it is in its closed or inoperative position, and the line 32 indicates the position of the actuating surface of the cam or the lower cam follower after the cam has been rotated thru an angle of 45°. The upper surface of the cam being concentric remains at the original distance from the center 33. Therefore the distance $d$ indicates the total amount of movement which can be transferred to the brake shoes when the cam is rotated thru an angle of 45°, no movement being transmitted to the upper shoe. In the construction shown in Figure 2, the upper shoe is stopped from rotating by the cam and since the heel of the cam, shown in dotted lines in Figure 1, is always concentric, this stop is always in the same position and the reaction of the shoe is always taken in a vertical line above the center of rotation 33 of the cam. However, upon a reverse movement of the vehicle, the lower portion of the cam forms the stop and the lower shoe presses against the same under the action of the upper shoe. The lower shoe thus tends to close up the cam against the operator, and the brake is hence very ineffective in reverse, for unless the operator exerts an excess pressure on the pedal the stop will move away from the shoe and the brake be released.

By using a differential cam, as shown in full lines in Figure 1, effective braking is obtained in both directions. The distance between the lines 30 and 34, indicated by $\frac{1}{3}d$, represents the amount of movement transmitted to the upper shoe when the cam is rotated thru an angle of 45° and the distance between the lines 31 and 35, represented by $\frac{2}{3}d$, is the amount of movement transmitted to the lower shoe when the cam is rotated thru an angle of 45°. Hence, with the type of cam here disclosed, the total movement $d = \frac{1}{3}d + \frac{2}{3}d$ is transmitted to the two shoes and is equivalent to the amount transmitted to the lower shoe by the oneway cam. The line of contact of the upper portion of the cam with its follower has, however, moved a horizontal distance, represented by $R_3$, away from the vertical line thru the center of the cam, and the line of contact of the lower portion of the cam with its follower has moved a distance $R_2$. The sum of these two distances, however, is less than the distance R of the line of contact of the lower portion of the oneway cam from its vertical center line. In traveling in the forward direction, the tendency to close up the cam against the operator acts thru the lever arm $R_3$ which is so small as to be almost negligible, and in traveling in a reverse direction, the tendency to close up the cam acts thru the lever arm $R_2$ which is so much less than R that very effective braking is obtained in the reverse direction. Hence a differential cam detracts but little from the forward braking and adds materially to the ease of braking in a reverse direction.

By using the cam as a stop for the brake shoes, the construction is simplified and both shoes are enabled to remain at all times in contact with the stop (cam). This provides an automatic adjustment and at the same time, by the action of the proper springs, flopping and rattling are entirely prevented. The brake by this construction is also more readily controllable and will not apply too severely or grab. Moreover the upward throw, as the cam turns, is equivalent to adjusting the stop automatically for the upper shoe which takes up some of the clearance between the shoe and the drum, obviating the necessity of frequent adjustments and reducing the amount of noise when the lower shoe takes hold and forces the upper shoe into contact with the drum. In fact, the parts can be so constructed that the shorter or stop lobe of the cam takes up practically all of the slack between the upper shoe and the drum before the lower shoe is driven into engagement with the drum by the longer or operating lobe of the cam. This prevents noise and shock which would result if the clearance of the upper shoe were suddenly taken up by being driven into the drum by the servo action of the lower or primary shoe. The action of the present brake as just described further prevents any tendency for grabbing or locking due to sudden jamming of the secondary shoe in the drum. Upon release of the cam, it will be seen that the movement of the upper shoe in the direction of the drum, as permitted by the stop lobe backing away, quickly releases the brake and places it under complete control of the operator. In other words, the servo action is instantly broken by releasing the stop.

To support the upper brake shoe and maintain it and thus the lower shoe, out of contact with the drum when the cam is in its normal position, an eccentric mounted disk 36 is used. This disk is carried by a stud or shaft 37, as best shown in Figure 3, and its inner face abuts the flat surface on the arm 11 thru which the stud 37 passes. The end of the stud is suitably shaped as at 38 to receive an adjusting wrench and between the outer surface of the arm 11 and the portion 38 the stud is threaded to receive the lock nut 39. Thus the position of the eccentric disk 36 can be adjusted from the outside of the brake, whether the same is open or enclosed, by loosening the lock nut 39 and rotating the stud 37 by a suitable tool applied to the end 38. It is then locked in adjusted position by tightening the lock nut. The disk 36 cooperates with the under surface of a flattened portion 40 on the web 24 of the brake shoe.

As a means for maintaining the shoes in position and to prevent rattling, their webs and the edges of the followers are adapted to be drawn against the arms 11, 12 and 13 of the brake spider by means of springs 41 and 42, which have their outer ends secured to suitable fastening means in the arms. The springs pass thru cored slots 43 in the webs of the brake shoes and their inner ends are provided with eyes thru which pass the short rods 44 which rest in the notches 45 in the peripheral flanges around the cored openings 43. These springs draw and tightly hold the flanges and followers of the shoes against the faces of the arms of the spider, but allow the ready removal of the shoes by the mere rotation of the pins 44 so that they can pass thru the elongated slots 43. The anchor ends of the shoes are held out of engagement with the brake drum by means of the springs 46.

When the brakes are assembled the cam 22 is turned until the shoes are both in contact with the drum. The eccentric support 36 is then rotated until it is in contact with the face 40 of the upper shoe. The eccentric is then slightly backed off and the lock nut 39 tightened. No further adjustment of the brake is necessary other than that of rotating the cam, but at rare intervals it is possible to readjust the support until minimum clearance is obtained between the upper shoe and the drum, thus reducing the amount of the pedal movement necessary to operate the brake.

It may sometimes be advisable to provide the cam with a floating actuating shaft. This construction is disclosed in Figure 5 where the brake shoes 15 and 16 are identical with those disclosed in Figure 2. The shaft 28 of the cam 22, however, instead of being mounted in a permanent bearing passes thru a vertical slot 47 in the arm 13 of the brake spider so that it may have limited vertical movement. The cam thus becomes self-centering and applies the two shoes with equal force to the drum. The bottom of the slot 47 limits the amount of movement of the cam shaft so that the cam can act as a stop as in the previous modification.

In Figure 6 the cam is shown in conjunction with a band type of internal expanding brake. Here a single resilient band 48 extends substantially the full distance around the inside of the brake drum and is supplied with a suitable friction lining 49. The ends of the band are provided with cam followers 50 by means of which the band may be expanded against the drum when the cam 22 is rotated. This cam is identical with that disclosed in Figure 2 and its shaft is mounted in a stationary bearing in the same manner. The band being resilient, is forced into contact with the whole interior surface of the drum when it is expanded and partakes of the same self-wrapping action as described in connection with Figure 2, the upper follower 50, when rotation is in the direction shown by the arrow, pressing against the cam, which then acts as a stop. Suitable retractile springs 50' may be used to withdraw the band from the drum when the cam is rotated to its normal position. Diametrically opposite the cam, the band is provided with an arm 51 adapted to have its lower surface rest upon an eccentric support 52 constructed and adjusted in the same manner as that described in connection with Figures 2 and 3. A spring 53 may be attached to the arm 51 to withdraw the band from the drum near that portion of its periphery.

Obviously the construction disclosed in Figure 6 may equally as well be used with a floating type of cam as shown in Figure 5 and partake of the same advantage.

In Figure 7 the differential cam is shown as applied to what may be termed a conventional form of internal expanding shoe brake in which each of the two shoes 54 is pivoted, at one of its ends, to a pivot such as 55, mounted securely on the brake spider, so that each shoe in effect rotates about its pivot when expanded by the cam 22. Since each shoe moves entirely independently of the other and there is no servo action, the differential cam 22 must have its shaft 56 mounted in a slot 57 so that it can have a floating action in order that both shoes may be applied simultaneously and with equal force against the drum. With forward braking taking place when the brake drum rotates in the direction of the arrow, it will be seen that there is a wrapping tendency for the lower shoe and an unwrapping tendency for the upper shoe. This would cause the upper shoe to be pressed against the top surface of the cam, tending to close up the cam against the operator. However, by using the differential cam, the lever arm of this "close up" tendency is very short, as illustrated by $R_3$ in Figure 1, and hence the operator is not required to press very hard upon the foot pedal. Furthermore the close up tendency is transmitted thru the cam to the lower shoe and assists in its application, this shoe being the one that is most effective in running in the forward direction. Upon reverse operation of the vehicle, braking is not quite so effective as in the forward direction, but nevertheless the lever arm tending to close up the cam is still quite short. This type of cam used with the conventional brake, is more effective in forward than in reverse braking, but since the vehicle is run at least 99% of the time in a forward direction, it will be seen that a great advantage is gained.

It is obvious that the differential cam may be applied to other purposes other than to the application or vehicle brake shoes. It is not desired therefore to limit its use to brakes.

Having thus described my invention, what I claim as new and desire to be secured by Letters Patent is:

1. A vehicle brake including in combination, a brake drum adapted for rotation mainly in one direction, brake shoes adapted to be expanded into engagement with said drum, said shoes being full floating, connected together and adapted to be partially rotated by said drum when in engagement therewith, a cam between the opposite ends of said shoes to expand them, said cam forming a stop for the leading shoe and having a short lobe to move this shoe less than the other.

2. A vehicle brake including in combination, a brake drum adapted for rotation mainly in one direction, internal friction elements connected together and adapted to cooperate with said drum, a pair of opposed cam followers secured to said elements and having faces substantially parallel to a radius of said drum, a cam having its center of rotation in said radius, said cam being adapted to engage said followers, one lobe of said cam being longer than the other, said shorter lobe acting as a stop for said friction elements to limit their rotation with said drum in the main direction of rotation.

3. A vehicle brake including in combination, a brake drum adapted to be rotated mainly in one direction, a pair of internal brake shoes mounted for partial rotation with and by said drum, said shoes having a pair of their ends connected together, parallel, opposed cam followers on the opposite ends of said shoes, a two lobed cam having one lobe engaging each of said followers, one lobe being shorter than the other and acting as a stop for said shoes in the normal direction of movement of said drum, the line of contact between said lobe and follower being but a short radial distance from the center of rotation of said cam for the purpose described.

4. In a vehicle brake, in combination, a brake drum, a brake spider, a brake shoe adapted for slight movement relative to said spider to engage said drum, a portion on said shoe overlapping and engaging said spider, a non-circular opening therein, a spring passing through said opening and secured to said spider, a rod secured to the opposite end of said spring and resting against the surface of said shoe portion, substantially parallel to the short axis of said opening.

5. In a vehicle brake, in combination, a brake drum, a brake spider, a brake shoe adapted for slight movement relative to said spider to engage said drum, a portion on said shoe overlapping and engaging said spider, a non-circular opening therein, a peripheral flange for said opening, a spring passing through said opening and secured to said spider, a rod secured to the opposite end of said spring, said rod having a length less than the longest axis of said opening, said flange having notches to receive said rod.

6. A brake including, in combination, a fixed member, a drum rotatable in respect thereto, brake shoes connected together and adapted to cooperate with said drum, a cam adapted to expand said shoe assembly, said cam forming the sole stop for all shoes, a shaft rotatable in a fixed bearing carrying said cam, said cam having two lobes, one long or operating lobe and one short or stop lobe.

7. A brake including, in combination, a fixed member, a drum rotatable in respect thereto, a floating deformable friction assembly extending throughout substantially the full inner circumference of said drum, means to expand said friction assembly into engagement with said drum, said means comprising a cam having a long lobe and a short lobe, said short lobe forming the sole stop to prevent rotation of said assembly when said drum rotates in a normal direction.

8. Brake mechanism of the internal expanding, self-energizing type including, in combination, a rotatable brake drum, a fixed member, an expansible friction element adapted to cooperate with said drum, a cam to expand said friction element and to prevent its rotation with said drum, and means on said cam to take up initial clearance between a portion of said friction element and said drum.

9. In a self-energizing, internal brake, in combination, a brake drum, two brake shoes, link means connecting adjacent ends of said shoes to an anchor, a cam between the remaining adjacent ends of said shoes, said cam being non-symmetrical, one lobe thereof acting as a slack take-up stop for the whole shoe assembly.

In testimony whereof I hereunto affix my signature.

EDWIN B. FLANIGAN.